PUSH BUTTON PULSE SIGNAL GENERATOR

Original Filed Aug. 11, 1971

INVENTORS
LEON R. BRITTON
FRANK S. VOJIR
WILLIAM W. WRIGHT
BY Molinare, Allegretti, Newitt & Witcoff
ATTORNEYS United States Patent Office Re. 28,205
Reissued Oct. 15, 1974

28,205

PUSH BUTTON PULSE SIGNAL GENERATOR

Leon R. Britton, 4018 N. Sacramento, Chicago, Ill. 60618; Frank S. Vojir, 2319 Gunderson Ave., Berwyn, Ill. 60402; and William W. Wright, 530 Pershing Ave., Wheaton, Ill. 60187

Original No. 3,718,828, dated Feb. 27, 1973, Ser. No. 170,729, Aug. 11, 1971. Application for reissue Nov. 8, 1973, Ser. No. 413,857
Int. Cl. H02k *35/06*
U.S. Cl. 310—15 4 Claims

Matter enclosed in heavy brackets [ ] appears in the original patent but forms no part of this reissue specification; matter printed in italics indicates the additions made by reissue.

ABSTRACT OF THE DISCLOSURE

A push button signal generator includes a coil mounted in a cylindrical housing with a plunger positioned in the center of the coil. The plunger is held in a fixed position by a permanent magnet within the housing. A push button may be depressed to drive the plunger through the coil thereby generating a pulse signal in the coil when the coil is placed in a circuit.

BACKGROUND OF THE INVENTION

In a principal aspect, the present invention relates to a push button pulse signal generator especially useful for providing control signals in a circuit which includes the push button signal generator.

Control circuits are often low voltage circuits. Therefore, a signal generator which provides a low voltage output, particularly a pulse output, can be easily integrated as part of a control circuit. Among the desirable features of a signal generator for a control circuit are simplicity of construction, low cost, ease of repair and reliability. Also, it is desirable to have as few moving parts as possible. Finally, it is desirable to have a signal generator which is compact or small.

A typical prior art switch is shown by U.S. Pat. No. 3,559,788 issued Feb. 2, 1971 to Jensen et al. This patent discloses a switch which provides a signal by driving a permanent magnet through a coil. The magnet is driven by moving a spring biased lever arm. It is desirable to eliminate mechanical parts of such a switch. The present invention, for example, permits the elimination of the mechanical spring from such a switch.

SUMMARY OF THE INVENTION

In a principal aspect, the present invention comprises an improved push button pulse signal generator wherein a coil which is incorporated as part of the circuit, provides a pulse signal output whenever a plunger is driven through the coil by movement of a push button. The plunger is normally held in a fixed position by a permanent magnet. Depression of the push button overcomes the holding force of the permanent magnet on the plunger and permits the push button to drive the plunger through the coil thereby generating a pulse signal in the coil and the circuit.

It is thus an object of the present invention to provide an improved push button signal generator.

It is a further object of the present invention to provide an improved push button signal generator having no springs or contacts.

One further object of the present invention is to provide a push button signal generator having a single moving part in addition to the push button.

These and other objects, advantages and features of the invention will be set forth in greater detail in the description which follows.

BRIEF DESCRIPTION OF THE DRAWING

In the detailed description which follows, reference will be made to the drawing comprised of the following Figures.

DESCRIPTION OF THE PREFERRED EMBODIMENT

Figure 1:
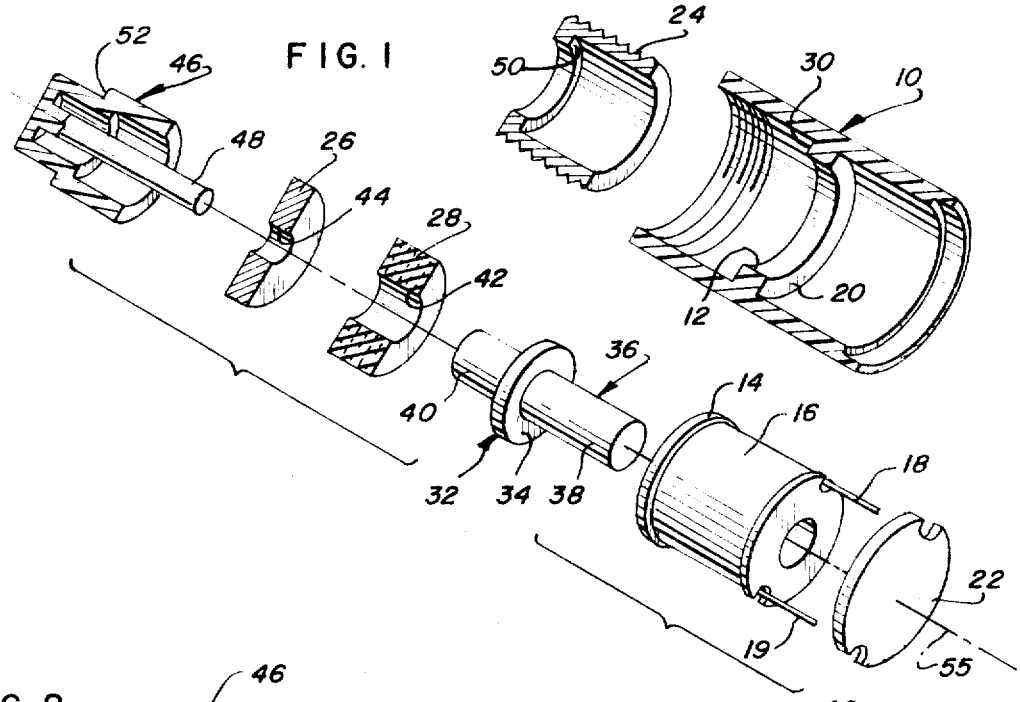
FIG. 1 is an exploded perspective view of the improved push button signal generator of the present invention wherein certain components of the device are shown in cross-section.

The apparatus of the invention includes a cylindrically shaped housing 10 having an internal circumferential flange 12 as illustrated in FIG. 1. A wire coil 16 having leads 18 and 19 is wound on a bobbin 14. The bobbin 14 is positioned against a lower surface 20 of flange 12. The bobbin 14 is maintained within the housing 10 by means of an end cover or plate 22. Suitable openings in plate 22 permit the leads 18 and 19 therethrough.

An externally threaded sleeve 24 is threaded into the opposite end of the housing 10. Sleeve 24 maintains a metal keeper 26 and a permanent magnet 28 in fixed position against an upper surface 30 of flange 12. The keeper 26 and permanent magnet 28 are therefore in a substantially fixed position within the housing 10 and cooperate to maintain a plunger 32 within the housing 10.

The unitary plunger 32 includes a flange 34 and a rod 36. Rod 36 includes a lower portion 38 extending in one direction from the flange 34 along the longitudinal axis of the housing 10. An upper portion 40 of rod 36 extends in the opposite direction from flange 34. The lower portion 38 extends into the center of coil 16. The upper portion 40 extends through an annular opening 42 in the magnet 28 and is engaged by the keeper plate 26 when the device is in an unoperated position. The keeper plate 26 also includes an opening 44. However, the opening 44 has a smaller diameter than the diameter of the upper portion 40 in order to maintain the plunger 32 in position by means of the keeper plate 26.

A push button 46 includes a rod shaped extension 48 extending through the opening 44 and in contact with the upper portion 40 of the rod 36. Flange surface 50 of the sleeve 24 and flange surface 52 of push button 46 cooperate to maintain the push button 46 within the housing 10.

All of the components of the switch are cylindrically shaped and coaxial. Thus, the push button 46, keeper plate 26, magnet 28, plunger 32, coil 16, bobbin 14 and end plate 22 all have a common axis 55. The housing 10 and sleeve 24 have the same common axis. The button 46 and plunger 32 are translatable along the axis 55.

Figure 2:
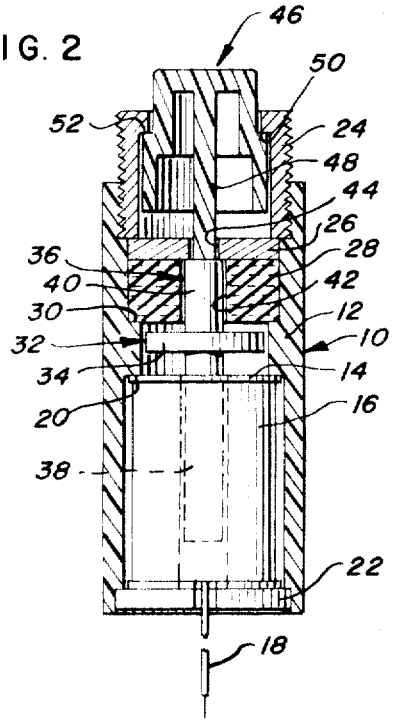
FIG. 2 is a cross-sectional elevation of the push button signal generator of the present invention wherein the push button is in a non-depressed position.

In operation, the plunger 32, which is fabricated from a material attracted to a magnet, is maintained in position by the magnetic force of the permanent magnet 28. In particular, the flange 34 is attracted by the magnet 28. Thus, the plunger 32 is maintained in the position shown in FIG. 2. This simultaneously maintains the push button 46 in the non-depressed position also shown in FIG. 2.

Figure 3:
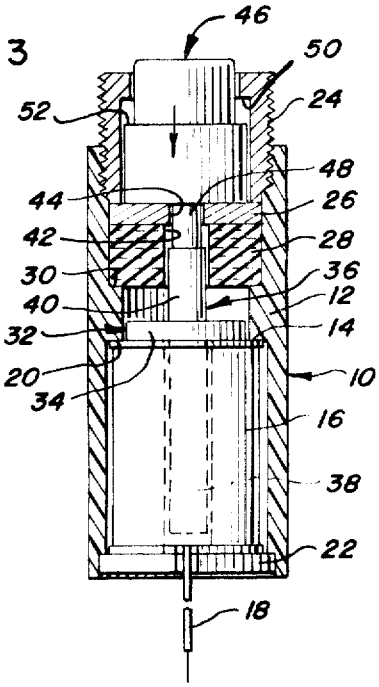
FIG. 3 is a cross-sectional view similar to FIG. 2 wherein the push button has been depressed.

To activate the signal generator, the push button 46 is manually depressed to overcome the force of the magnetic attraction of the magnet 28 for the plunger 32. This drives the lower portion 38 of the plunger 32 through the coil 16, thereby generating a pulse signal in a circuit. FIG. 3 illustrates the device subsequent to depression of the push button 46.

Thus, the push button extension 48 impinges on the upper portion 40 of the plunger 32. When the manual force up on the push button 46 is sufficiently great, the plunger 32 breaks away from the keeper plate 26 quite suddenly, the lower portion 38 moving as suddenly through coil 16. This sudden breaking of the magnetic hold on plunger 32 and movement of the lower portion 38 in coil 16 causes a rapid change in the flux density in the coil 16. In turn, a voltage is induced in the coil 16 and a connected circuit. Removal of the force upon the button 46 allows the plunger 32 to return under the influence of the permanent magnet 28 causing a similar induced voltage, though of opposite polarity, in coil 16. The plunger 32 thus returns to the position determined by the keeper 26 and magnet 28.

The sudden breaking and remaking of the magnetic circuit between the keeper 26 and plunger 32 provides the "feel" of a detent and spring return. This feel as well as the output characteristics of the signal generator can be varied by changing the strength of the magnetic field, for example, (1) by using a magnet of different strength, or (2) by changing the gap between the flange 34 and the magnet, or (3) by changing the thickness or plating of the non-magnetic material on surfaces of the keeper plate or plunger, or (4) by changing the material and the gap between the flange 34 and the magnet 28. Additionally, the shape of the magnet 28, the shape of the plunger 32, or the construction of the coil winding 16 can be varied to achieve different characteristics of the signal.

Figure 4:
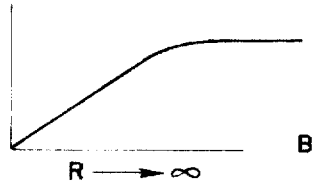
FIG. 4 is a graph of typical voltage output of the signal generator versus the resistance of a circuit in which the signal generator is incorporated.

FIG. 4 represents the typical variation in voltage with resistance of a signal generated by the generator of the present invention. Note that since the induced voltage in a circuit including the coil 16 is a result in change of flux density in the coil winding, the return of the plunger 32 into contact with the keeper plate 26 will also result in another output pulse signal having opposite polarity from the pulse signal created during depression of the push button 46. This may or may not be desirable depending upon the design of the circuitry in which the device operates. However, by proper use of a diode, the pulse signal of either polarity can be blocked.

Advantageously, the device has only one moving part, and it is not the type of part which is required to flex such as a spring. Thus, the device has an exceptionally long life and simultaneously maintains consistent signal generating characteristics. Therefore, the apparatus of the present invention is to be limited only by the scope of the following claims and their equivalents.

What is claimed is:

1. A push button signal generator comprising, in combination: a housing having a longitudinal axis and having mounted therein the following:

a. a coil with a center opening parallel to the longitudinal axis;

b. a plunger of magnetic material including a portion movable in the coil opening, a flange portion outside one end of the coil and a projection extending from said flange portion;

c. a magnet adjacent said flange portion for magnetically attracting said flange portion in a first direction;

d. a keeper plate *on said magnet* for engaging said projection from said plunger to limit the travel of said plunger in said first direction; and e. push button means including [an extension] *means* for engaging said plunger and driving said plunger *from said keeper plate* in a direction opposite the first direction.

2. The signal generator of claim 1 wherein said coil is in a circuit.

3. The apparatus of claim 1 wherein said keeper plate prevents physical contact of said flange and said magnet.

4. The apparatus of claim 1 wherein said flange is intermediate said coil and said magnet.

References Cited

The following references, cited by the Examiner, are of record in the patented file of this patent or the original patent.

UNITED STATES PATENTS

| | | | |
|---|---|---|---|
| 3,398,302 | 8/1968 | Harnau et al. | 310—15 X |
| 3,132,268 | 5/1964 | Abel et al. | 310—15 |
| 3,130,332 | 4/1964 | Zehfeld et al. | 310—15 |
| 3,153,736 | 10/1964 | Etter | 310—15 |
| 3,116,428 | 12/1963 | Blodgett et al. | 310—15 |
| 3,693,033 | 9/1972 | Troesh | 310—15 X |

DONOVAN F. DUGGAN, Primary Examiner